June 12, 1962     E. A. HIRZEL     3,038,559
DISC BRAKE AND PRESSURE APPLYING MEANS THEREFOR
Filed Dec. 17, 1958     2 Sheets-Sheet 1

INVENTOR.
EDGAR A. HIRZEL

BY
R. L. Miller
ATTORNEY

June 12, 1962    E. A. HIRZEL    3,038,559
DISC BRAKE AND PRESSURE APPLYING MEANS THEREFOR
Filed Dec. 17, 1958    2 Sheets-Sheet 2
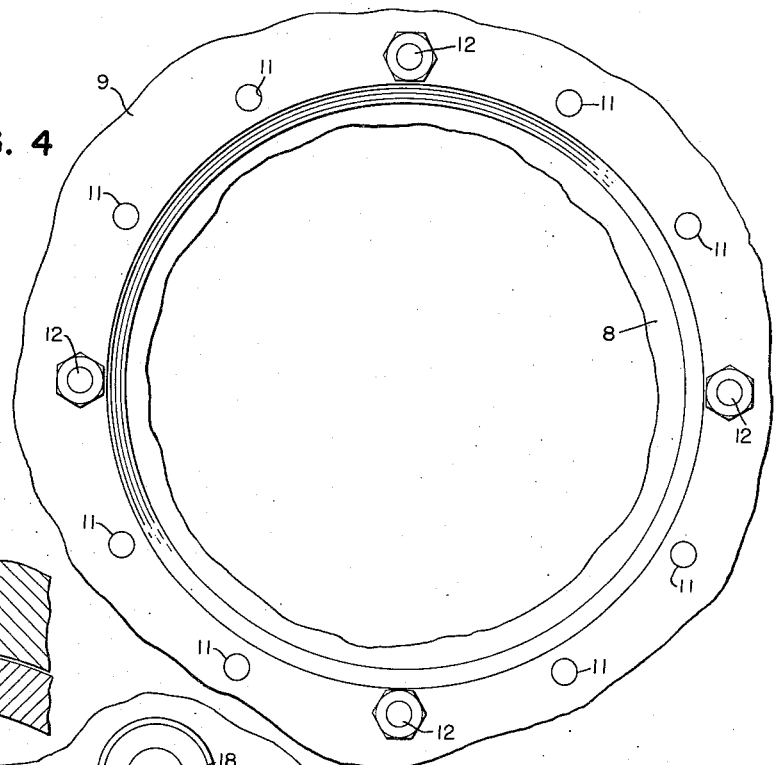
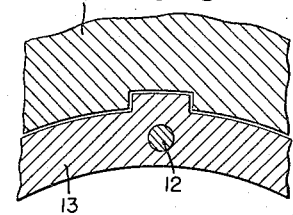
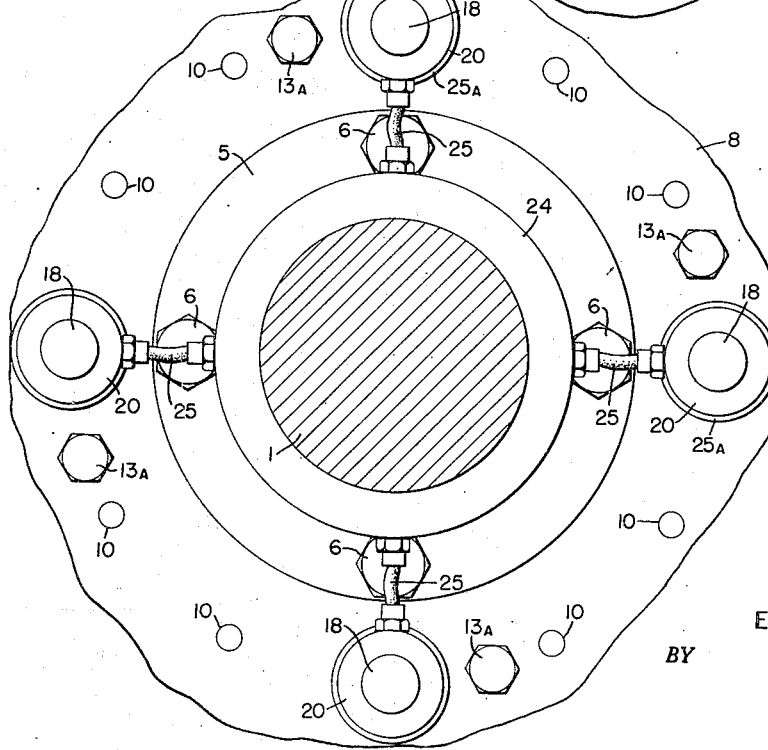
INVENTOR.
EDGAR A. HIRZEL
BY
ATTORNEY

United States Patent Office 3,038,559
Patented June 12, 1962

3,038,559
DISC BRAKE AND PRESSURE APPLYING MEANS THEREFOR
Edgar A. Hirzel, Cuyahoga Falls, Ohio, assignor to The Goodyear Tire & Rubber Company, Akron, Ohio, a corporation of Ohio
Filed Dec. 17, 1958, Ser. No. 781,128
3 Claims. (Cl. 188—72)

This application relates to disc brakes and particularly to such brakes for use on aircraft.

In brakes for use on aircraft it is usual to provide a plurality of discs keyed to a landing wheel but capable of movement axially thereof and a plurality of discs interleaved therewith and keyed to a non-rotatable axle which rotatably supports the wheel, these discs also being capable of movement axially of the axle. Hydraulic cylinder means is usually provided for clamping the interleaved discs axially to apply braking pressure.

In brakes of this type heretofore proposed, as the hydraulic cylinder area is fixed the available pressure for brake application is dependent entirely on line pressure. Also no means has been provided whereby the number of discs or the area available for application of hydraulic pressure could be changed readily.

The present invention has for an object to provide a brake assembly of substantially standard parts which can be utilized, by employing more or less of these parts, to provide a plurality of brakes of different specified requirements.

Another object is to provide a brake assembly of the character described wherein a brake having a desired hydraulic pressure area can be provided simply by using more or less and a selected number of hydraulic cylinders.

Another object is to provide for change in the number of brake discs utilized.

Still another object is to provide hydraulic cylinder means individual to the brake assembly bolts or integral therewith.

These and other objects will be apparent from the following description, reference being had to the accompanying drawings forming a part hereof.

Figure 1:
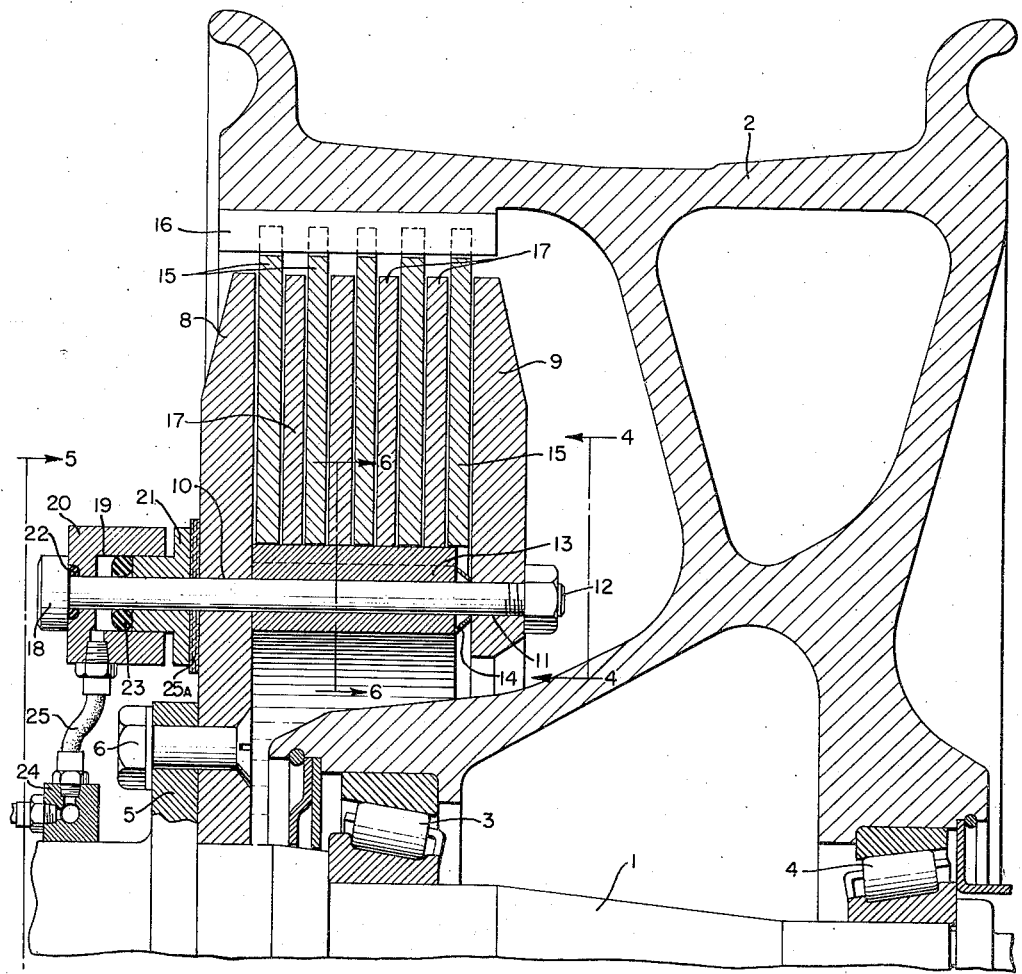
FIG. 1 is an axial sectional view of a wheel and axle with a brake embodying the present invention, parts being broken away and parts shown in section.

FIGS. 4, 5, and 6 are views taken substantially on lines 4—4, 5—5, and 6—6, respectively of FIG. 1.

Referring to the drawings, and first to FIG. 1, this shows a non-rotatable axle 1, about which a wheel 2 is mounted for rotation on bearings 3, 4. The axle is formed with a radial torque flange 5 to which a torque and pressure plate 8 is secured by bolts 6 evenly spaced thereabout. A pressure plate 9 is provided opposite to plate 8.

The plates 8 and 9 are provided with axially aligned openings 10, 11 at spaced intervals circumferentially thereof to receive a selected number of assembly bolts 12 spanning the space therebetween. Each bolt 12 extends through holes in a hub-like tubular torque tube 13 shorter than the space between the plates 8 and 9 and a spring washer or Belleville washer 14 is placed about each bolt between one of the pressure plates and the torque tube for the purpose of holding the plates in spaced apart relation and returning them to such position after a braking action. The torque tube 13 is usually bolted by bolts 13a to the torque plate 8 at points circumferentially between the bolts 12.

Between the pressure plates 8 and 9 are a plurality of brake discs 15 for example, five each having outer peripheral notches at spaced intervals thereabout for receiving keys 16 carried by the wheel 2, the brake discs being arranged to float axially of the wheel along the keys. Also between plates 8 and 9 are a second set of brake discs 17 interleaved with brake discs 15 and having notches in their inner peripheries for keyed engagement with splines on torque tube 13 to prevent their rotation.

The pressure plates 8 and 9 may have a multiplicity of aligned openings 10, 11 equally spaced thereabout and the number of bolts 12 may be equal to or less than the number of openings. Also brake discs 17 may have the same number of inner peripheral notches as the openings in plates 8 and 9 or less as desired. For example, pressure plates 8 and 9 might each have twelve equally spaced apart opposed openings 10, 11 while two, three, four, six or twelve bolts 12 might be employed and equally spaced about the brake. This provides for considerable variation in the number of hydraulic cylinders used and the hydraulic pressure area resulting, as will be evident.

For applying braking pressure to the brake discs each bolt 12 is formed with a head 18 beyond the pressure plate 8. A circumferential cylinder 19 is formed in a collar 20 about the bolt and an annular piston 21 is also slidably mounted about the bolt within the cylinder, the cylinder and piston being mounted between the pressure plate 8 and the bolt head 18. For sealing the cylinder 19, a sealing ring 22 is mounted between the collar 20 and the bolt and a sealing ring 23 is mounted against the piston 21 within cylinder 19.

For providing pressure to the cylinder 19, an annular manifold 24 may be provided about axle 1 and may be supplied by a pipe from a control valve, not shown. Flexible conduits 25 individual to the cylinders 19 connect the cylinders 19 to the manifold 24.

It will be apparent that by removing the bolts 12 and pressure plate 8, the number of discs 15 and 17 may be changed to increase or decrease brake contact area. Also by changing the number of bolts 12 with their corresponding pressure fluid operated cylinders and pistons, the total pressure applied to the brake may be increased or decreased. Thus it will be seen that with a known maximum fluid pressure of the brake operating system, the total pressure desired at the brake may be readily adjusted by changing the number of assembly bolts and cylinders.

The spring washers 14 are for the purpose of releasing the brake when the hydraulic pressure is shut off and the cylinders connected to exhaust by the operating valve, the washers then acting to return the adjacent pressure plate and the pistons in the pressure cylinders to normal clearance positions. Any number of such spring washers may be employed, one for a bolt 12 up to the total number of bolts 12, thereby providing for change in the return force available.

It will be seen that the construction is especially desirable where experimental changes in maximum braking pressure, brake disc area, return spring pressure and resistance to torque are desired as these values may be changed quite easily while the brake is installed on a vehicle. A heat-insulating washer 25a may be placed between cylinder 19 and pressure plate 8 to protect the cylinder from heat developed at the brake discs.

Figure 2:
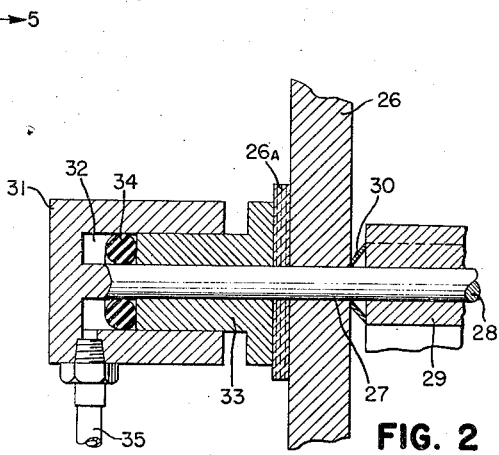
FIG. 2 is a detail sectional view of part of a similar brake structure showing a modified construction of operating cylinder and assembly bolt, other parts being broken away.

Whereas in FIG. 1 the cylinder 19 and piston 21 have been shown as removable from the assembly bolt 12 either the cylinder or the piston may be made integral with the assembly bolt if desired. In the embodiment of FIG. 2, a pressure plate 26 corresponding to plate 8 of FIG. 1 has an opening 27 through which an assembly bolt 28 passes. The bolt is surrounded by a torque tube 29 and spring washer 30 as in the embodiment of FIG. 1. The bolt 28 in the present embodiment is formed with a head 31 having an annular cylinder 32 in its underface for receiving an annular piston 33 between the head 31 and the pressure plate 26. A sealing ring 34 is provided within cylinder 32 to seal it to piston 33. A conduit 35 connects the cylinder 32 to a control valve, not shown, supplying fluid pressure to advance the pressure plate 26, the spring 30 acting to return the pressure plate and restore brake clearance. A heat insulating washer 26a may be placed about the shank of bolt 28 between the plate 26 and piston 33 to insulate the cylinder from heat developed at the brake.

Figure 3:
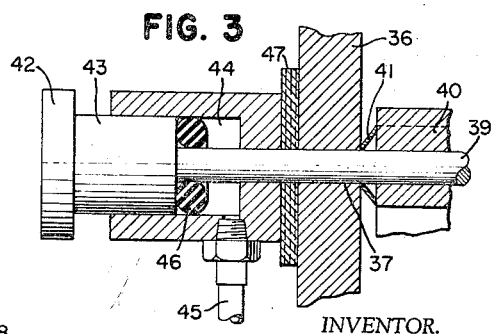
FIG. 3 is a view similar to FIG. 2, showing another embodiment of the invention.

In the embodiment of FIG. 3, the pressure plate 36 corresponding to the disc 8 of FIG. 1, has an opening 37 through which a brake assembly bolt 39 passes, a torque tube 40 and spring washer 41 also surrounding the bolt. In this embodiment the bolt 39 has a head 42 formed with an integral piston 43. An annular cylinder 44 is provided about the bolt between the head 42 and the pressure plate 36 for tensioning the bolt 39 to apply brake pressure. A flexible conduit 45 connects the cylinder 44 to a valve, not shown, for applying fluid pressure. A sealing ring 46 within the cylinder 44 seals the piston to the cylinder. Upon release of fluid pressure in the cylinder 44, the spring washer 41 returns the piston releasing tension on bolt 39 and the spring washer also reestablishes brake clearance. A heat insulating washer 47 may be provided about the shank of bolt 39 to insulate the cylinder 44. Thus it will be seen that any of the forms of assembly bolt and unitary piston cylinder mechanism can be used in the brake construction illustrated in FIG. 1 and the braking pressure can be adjusted by changing the number of bolt and cylinder assemblies and the objects of the invention have been accomplished. In any of the described embodiments, the brake operating cylinders are operated by hydraulic pressure, the aircraft or other vehicle on which the brake is mounted being equipped with a system for supplying fluid under pressure and a pilot-operated valve which at one position supplies fluid under pressure to the brake cylinders and in another position connects the brake operating cylinders to exhaust.

While certain representative embodiments and details have been shown for the purpose of illustrating the invention, it will be apparent to those skilled in this art that various changes and modifications may be made therein without departing from the spirit or scope of the invention.

What is claimed is:

1. A multiple disc brake including a fixed axle, a torque flange on the axle, a wheel journalled on the axle, said wheel having an overhanging rim portion, a plurality of axially-parallel, circumferentially spaced keys on the inner periphery of the overhanging rim portion, a plurality of rotatable brake discs carried with the wheel and having their outer peripheries splined to said keys, a pressure plate secured to the torque flange and extending to a position closely under the bead seat of the overhanging rim portion, a circular torque tube carried by the pressure plate and positioned inside of the rotatable discs, a plurality of stationary brake discs interleaved between the rotary brake discs and splined to the tube, a second pressure plate at the opposite end of the stack of interleaved discs, compression spring means between the tube and the second pressure plate, a plurality of axially parallel, circumferentially spaced bolts extending through holes in the tube and both pressure plates and connected to the second pressure plate, a fluid pressure motor for each bolt and mounted on the side of the first pressure plate remote from the discs, a circular fluid pressure manifold mounted on the axle, and flexible conduit means connecting the manifold with each fluid pressure motor.

2. A multiple disc brake including a fixed axle, a torque flange on the axle, a wheel journalled on the axle, said wheel having an overhanging rim portion, a plurality of axially parallel, circumferentially spaced keys on the inner periphery of the overhanging rim portion, a plurality of rotatable brake discs carried with the wheel and having their outer peripheries splined to said keys, a pressure plate secured to the torque flange and extending to a position closely under the bead seat of the overhanging rim portion, a torque tube carried in non-rotary relation with respect to the pressure plate and positioned inside of the rotatable discs, a plurality of stationary brake discs interleaved between the rotary brake discs and splined to the tube, a second pressure plate at the opposite end of the stack of interleaved discs, compression spring means between the tube and one of said pressure plates, a plurality of axially parallel, circumferentially spaced bolts extending through the tube and both pressure plates and connected to the second pressure plate, a fluid pressure motor for each bolt and mounted on the side of the first pressure plate remote from the discs, a fluid pressure manifold mounted on the axle, and conduit means connecting the manifold with each fluid pressure motor.

3. The combination recited in claim 2 wherein the overhang of the rim portion of the wheel is of a size so that any selected number of rotatable discs, such as five or less can be used in the brake with mating stationary discs, and wherein pressure plates are provided with a considerable plurality of circumferentially spaced holes, such as twelve, so that any selected number of fluid pressure cylinders and bolts can be employed, whereby from one set of stock brake parts a brake can quickly be constructed having torque absorbing characteristics anywhere between relatively low and relatively high limits.

References Cited in the file of this patent

UNITED STATES PATENTS

| | | |
|---|---|---|
| 1,617,276 | Sarff | Feb. 8, 1927 |
| 2,095,805 | Frank | Oct. 12, 1937 |
| 2,376,685 | Goepfrich | May 22, 1945 |
| 2,548,008 | Franklin | Apr. 10, 1951 |

FOREIGN PATENTS

| | | |
|---|---|---|
| 715,127 | Great Britain | Sept. 8, 1954 |